United States Patent [19]
Hatano

[11] Patent Number: 5,864,373
[45] Date of Patent: Jan. 26, 1999

[54] VIDEO SIGNAL DETECTION CIRCUIT AND VIDEO SIGNAL PROCESSING DEVICE

[75] Inventor: Hiroyuki Hatano, Kyoto, Japan

[73] Assignee: Rohm Co., Ltd., Kyoto, Japan

[21] Appl. No.: 658,661

[22] Filed: Jun. 5, 1996

[30]      Foreign Application Priority Data

Jun. 14, 1995   [JP]   Japan ................................. 7-171398

[51] Int. Cl.$^6$ ................................................. H04N 5/62
[52] U.S. Cl. .......................... 348/737; 348/607; 348/736
[58] Field of Search ................................. 348/736, 737,
348/735, 725, 726, 727, 539, 549, 558,
607, 618, 624, 454, 555; 358/195.1, 160,
25, 197, 27, 31, 39, 143, 196; 178/5.4;
H04N 5/455, 5/60, 5/62, 5/46, 9/00

[56]          References Cited

U.S. PATENT DOCUMENTS

| | | | |
|---|---|---|---|
| 3,204,025 | 8/1965 | Przybyszewski | .......................... 178/5.8 |
| 4,811,096 | 3/1989 | Gakumura | ................................ 358/160 |
| 4,933,767 | 6/1990 | Hyakutake | ........................... 358/195.1 |
| 5,644,368 | 7/1997 | Natsume | ................................ 348/737 |

*Primary Examiner*—Andrew I. Faile
*Assistant Examiner*—Uyen Le
*Attorney, Agent, or Firm*—Fay, Sharpe, Beall, Fagan, Minnich & McKee

[57]           ABSTRACT

A video signal detection circuit of the present invention is provided with a trapping circuit which traps frequencies corresponding to color sub-carrier wave signal components and which is disposed between a phase comparing circuit and a voltage controlled oscillation circuit in a PLL circuit performing synchronous detection.

3 Claims, 2 Drawing Sheets

VIDEO SIGNAL DETECTION CIRCUIT AND VIDEO SIGNAL PROCESSING DEVICE

BACKGROUND OF THE INVENTION

1. Field of the Invention

The present invention relates to a video signal detection circuit and a video signal processing device, and, more specifically, relates to a video signal detection circuit for PLL synchronous detection which suppresses leakage onto a picture plane of so called C/S beat signals representing beat components of color sub-carrier waves and sound carrier waves in an intermediate frequency amplifier circuit (IF circuit) of a video signal processing device, such as a TV receiver or a VTR.

2. Background Art

In a video signal processing device such as a TV receiver or a VTR, intermediate frequency signals (IF signals) which are transmitted from a tuner in response to channel selection are normally received by a video signal detection circuit by a SAW filter (a comb filter). In this device, there are two methods for separating video signals from the sound signals. In one method, respective SAW filters for the video relating signals and for the sound relating signals are provided and these signals are separated at the IF stage, and in the other method the video relating signals and the sound relating signals are received by a common single SAW filter and the sound signal components are separated by a band pass filter (BPF) and transmitted to a sound detection circuit after video signal detection.

On the other hand, at the detection output of the video signal detection circuit other than luminance signals and chroma signals such as sound carrier wave signals of 4.5 MHz and C/S beat signals representing the beat of the sound signals and the chroma signals as explained above, for example a beat component normally of 920 kHz in an NTSC system, are generated. Since reproduced picture images are likely to suffer from video disturbance by the C/S beat signals, the sound relating signals are normally attenuated by about several tens of dB with respect to the video relating signals so as to suppress the C/S beats. In particular, since the frequency of the voice sound carrier waves of 4.5 MHz is high, these components are removed after the video signal detection with the provision of a trapping circuit.

In the former method in which the two separate SAW filters are provided, since the sound relating signals and the video relating signals are separated from each other, an advantage that the influence of the C/S beat signals is suppressed accordingly is obtained; however, the number of circuits which are to be formed into ICs is increased correspondingly to thereby increase the cost thereof. On the other hand, in the latter method in which the single common SAW filter is provided, the circuit scale thereof is reduced to thereby realize a system of a low cost, however, since sound signals flow through the video signal detection circuit, C/S beat signals are generated and the generated C/S beat signals appear on the picture plane which poses a problem of reducing the picture quality. In particular, in a case of a video signal detection circuit for a PLL synchronous system, since phase detection outputs are returned to a PLL, the circuit is more likely affected by the C/S beat signals in comparison with other detection systems.

SUMMARY OF THE INVENTION

An object of the present invention is to resolve the above problems in the conventional art and to provide a video signal detection circuit which suppresses the generation of C/S beat signals even if video relating signals and sound relating signals are signal processed via a common SAW filter.

Another object of the present invention is to provide a video signal processing device which suppresses an adverse influence by C/S beat signals to the picture quality of reproduced picture images.

A video signal detection circuit and a video signal processing device according to the present invention which achieve the above objects are characterized in that the video signal detection circuit which receives outputs from a video intermediate frequency amplifier circuit and performs detection of video signals therein comprises a synchronous detection circuit which receives the outputs and performs synchronous detection of the video signals; a PLL circuit including a phase comparing circuit, a voltage controlled oscillation circuit, and a smoothing circuit, in which the phase comparing circuit compares the outputs from the video intermediate frequency amplifier circuit with the outputs of the voltage controlled oscillation circuit, a signal corresponding to the comparison result is applied to the voltage controlled oscillation circuit via the smoothing circuit and the output of the voltage controlled oscillation circuit is transmitted to the synchronous detection circuit as a reference signal for the synchronous detection; and a trapping circuit which is disposed in a signaling passage from the phase comparing circuit to the voltage controlled oscillation circuit and traps signals having frequencies corresponding to color sub-carrier wave signal components contained in the video signals.

With the provision of the trapping circuit which traps the signals having frequencies corresponding to the color sub-carrier wave signal components at a position between the phase comparing circuit and the voltage controlled oscillation circuit in the PLL circuit which performs the synchronous detection, the level of the color sub-carrier wave signals in the synchronous detection reference signal for the synchronous detection is lowered.

Thereby, the level of the C/S beat signals in the synchronous detected video outputs is lowered and the leakage of the C/S beat signals onto the picture plane is suppressed. Moreover, in this instance it suffices to provide a single trapping circuit which traps only the signals having frequencies corresponding to the color sub-carrier wave signal components, and the trapping frequency can be increased so that the circuit can be realized only by adding a simple circuit. Further, a common single SAW filter can be applied for the sound relating signals and the video relating signals.

DESCRIPTION OF THE PREFERRED EMBODIMENT

Figure 1:
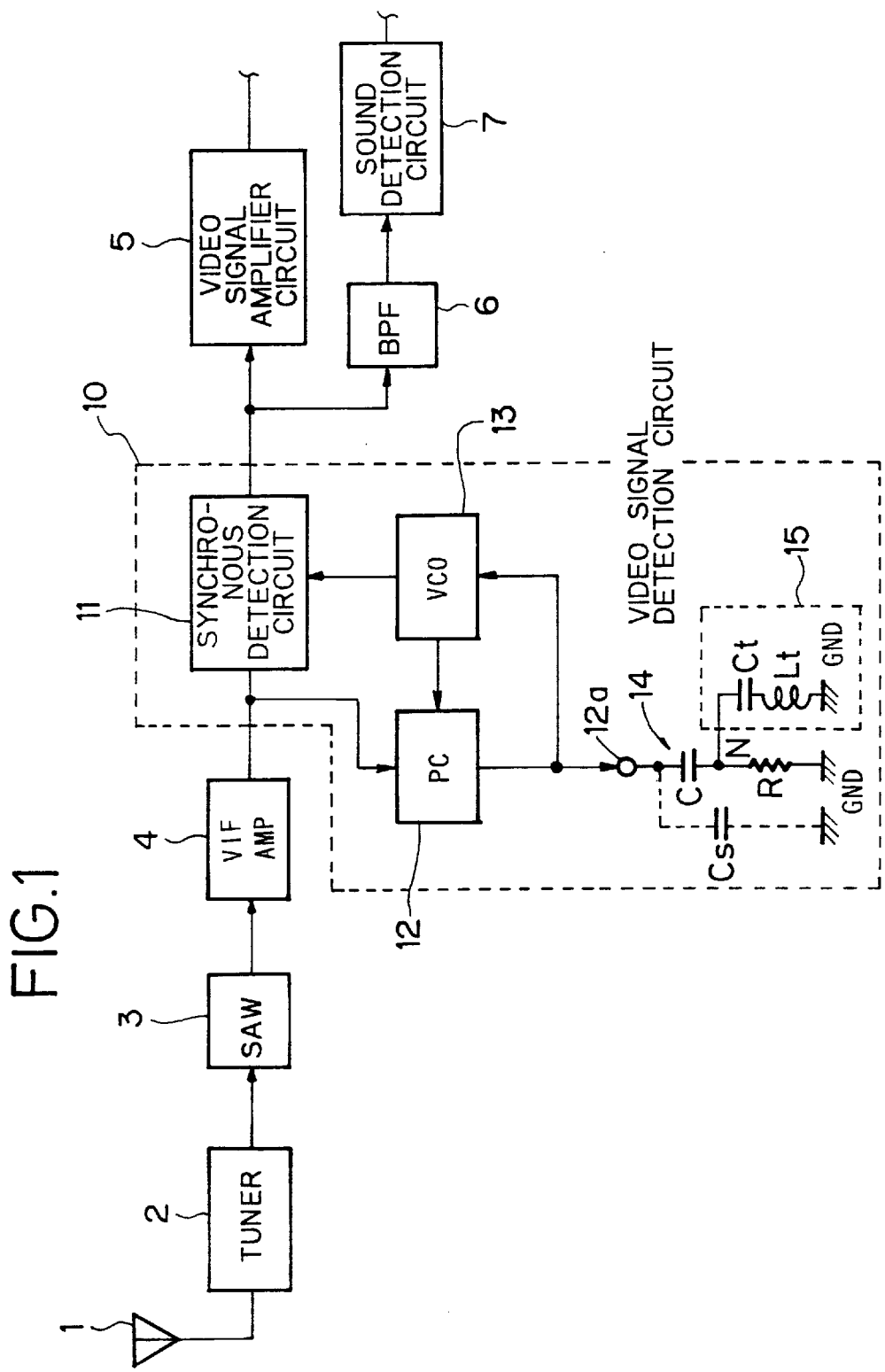
FIG. 1 is a block diagram of an embodiment of a TV signal receiving device including a video signal detection circuit according to the present invention as a major portion thereof.

In FIG. 1, numeral 10 is a video signal detection circuit. Radio wave receiving signals (radio frequency signals)

received at an antenna 1 are amplified in high frequency by a tuner 2 and then are frequency mixed with signals from a built-in local oscillation circuit therein, whereby the radio wave receiving signals are frequency converted into intermediate frequency signals signals of a selected channel (in an NTSC system the video frequency is at 58.75 MHz and the sound frequency is at 54.25 MHz). The outputs from the tuner 2 are subjected to a filtering process in a SAW filter 3 and thereafter transmitted to a video intermediate frequency amplifier circuit (VIFAMP) 4.

The VIFAMP 4 amplifies in high frequency the selected intermediate frequency band and transmits the same as the output to the video signal detection circuit 10. The video signal detection circuit 10 receives the amplified signals and transmits the same to a synchronous detection circuit 11 and a phase comparing circuit (PC) 12. The synchronous detection circuit 11 transmits the detection outputs to a video signal amplifier circuit 5 as well as to a sound detection circuit 7 via a BPF 6 which is positioned at a post stage for the amplifier circuit 5.

The synchronous detection circuit 11 is a so-called PLL type synchronous detection circuit and receives signals of reference frequency locked via the PLL from a voltage controlled oscillator (VCO) 13 as the reference signal for the synchronous detection. By way of example, the synchronous detection circuit multiplies the received reference signal with the output from the VIFAMP 4 via a multiplying circuit therein and outputs the resultant multiplied signal as a video detection signal, such as to the video signal amplifier circuit 5 via a low pass filter (LPF).

The VCO 13 further transmits the output thereof to the PC 12. The PC 12 performs phase comparison between the output of the VCO 13 and the output of the VIFAMP 4 and transmits the resultant compared signal to a smoothing circuit 14.

The smoothing circuit 14 is a kind of low pass filter and the output voltage thereof is applied to the VCO 13 so that the center oscillation frequency is controlled to assume the above indicated frequency of 58.75 MHz. At the output thereof other than the smoothed voltage, the color sub-carrier wave component of 55.17 MHz and the sound carrier wave component of 54.25 MHz corresponding to the video carrier wave component of 58.75 MHz, and color sub-carrier wave component of 3.58 MHz and sound carrier wave component of 4.5 MHz corresponding to the detuning frequency components of their carrier wave components, respectively appear. Further higher high frequency components are sufficiently attenuated such as by a parasitic capacitor Cs. Further, other than the above, through the cross modulation of the color sub-carrier wave component of 3.58 MHz and the sound carrier wave component of 4.5 MHz, C/S beat components are further generated. Namely, at the output terminal 12a of the PC 12 in addition to the generated control voltage, the signal component of 3.58 MHz, the signal component of 4.5 MHz and the signal component of 920 kHz are superposed with comparatively high output levels.

Therefore, through attenuation of either the color sub-carrier wave component of 3.58 MHz or the voice sound carrier wave component of 4.5 MHz the C/S beat components can be reduced, however such reduction is limited. In the present invention, regardless of the above attenuation of either the color sub-carrier wave component of 3.58 MHz or the sound carrier wave component of 4.5 MHz, the frequency components corresponding to the color sub-carrier wave components are, in particular, attenuated. Thereby, the C/S beat components are reduced.

The smoothing circuit 14 normally includes a series circuit of a capacitor C and a resistor R connected successively between the output terminal 12a of the PC 12 and the ground GND serving as a PLL filter, and a low pass filter constituted by the parasitic capacitor Cs connected between the output terminal 12a and the ground GND. A capacitor having a capacitance of about 0.1 $\mu$F~1 $\mu$F is used for the capacitor C and a resistor having a resistance of about 150$\Omega$ is used for the resistor R. As a result, the time constant determined by the capacitor C and the resistor R is small. If a large time constant is used therefor, a problem is posed that the response characteristic and the pulling characteristic of this type of PLL circuit are varied, which limits the increase of the time constant. However, because of the small time constant determined by the capacitor C and the resistor R, the attenuation of the signal components such as the color sub-carrier wave of 3.58 MHz and the sound carrier wave of 4.5 MHz is difficult.

Accordingly, in the present embodiment a color sub-carrier wave trap 15 constituted by a capacitor Ct and a coil Lt connected successively in series between the junction point N of the capacitor C and the resistor R and the ground GND is provided. With the trap 15 the level of the color sub-carrier wave signal component which is superposed over the control voltage is reduced. As a result, the level of the color sub-carrier wave signal component among the outputs of the VCO 13 is reduced.

Thereby, the video detection is performed with a synchronous detection reference signal in which the color sub-carrier wave component in the oscillation output of the VCO 13 is attenuated. Thus, the level of the C/S beat signals in the detected video signals is reduced without reducing the sound signal components. Further, in this instance it is possible to trap the sound carrier wave component together with the color sub-carrier wave component and to further reduce the level of the C/S beat signals if a trapping circuit is increased. However, if a signal trapping circuit exclusive only for the color sub-carrier wave component is provided as explained previously, the circuit structure is simplified correspondingly and a sufficient advantage is obtained by trapping only the color sub-carrier wave component having a higher frequency. Further, reduction of the sound quality is prevented.

Figure 2:
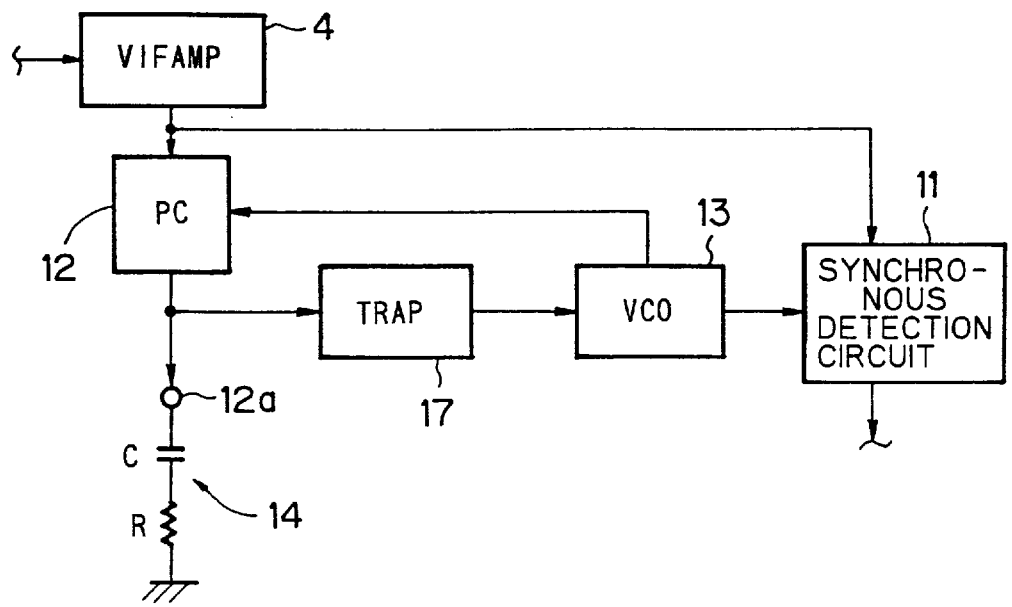
FIG. 2 is a block diagram including a trapping circuit as a major portion thereof which is applicable both for a PAL system and for an NTSC system.
Figure 3:
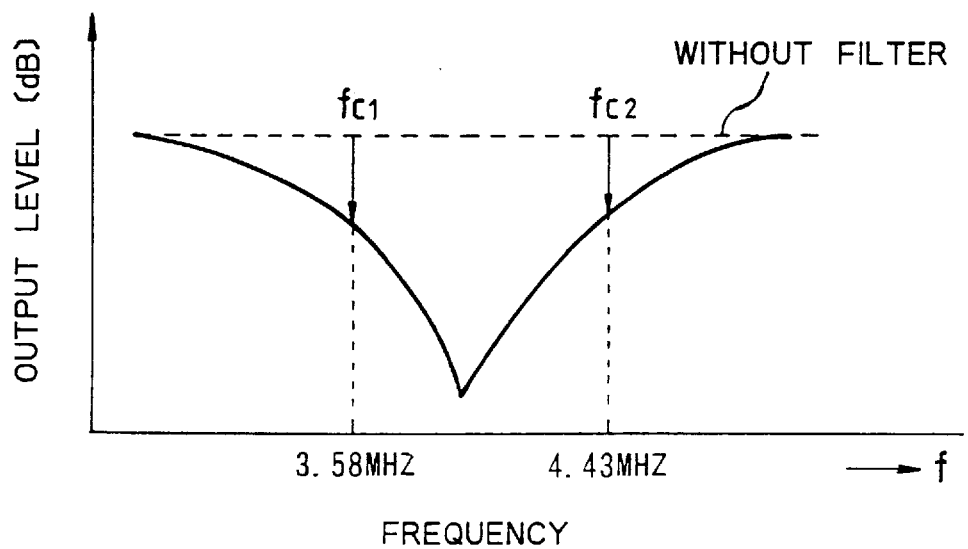
FIG. 3 is a diagram for explaining a trapping frequency characteristic of the trapping circuit for color sub-carrier wave signal components in video signals to be detected.

FIG. 2 is a trapping circuit applicable for both an NTSC system and a PAL system, in which a color sub-carrier wave trap 17 is provided which has a reduced Q as illustrated in FIG. 3 with respect to that of the color sub-carrier wave trap 15 (a trap filter) as illustrated in FIG. 1. Such Q reduction can be normally realized by shifting the center oscillation frequency through simple selection of the values of the capacitor Ct and the coil Lt. As illustrated in FIG. 3, the position of the center oscillation frequency (the trough in the filter characteristic curve) is set at the intermediate position of 3.58 MHz and 4.43 MHz which respectively correspond to the color sub-carrier wave components for the NTSC system and the PAL system. With this measure, the levels of the frequencies of 3.58 MHz and 4.43 MHz are equated which respectively correspond to the color-carrier wave components for the NTSC system and the PAL system. In other words, the position of the center oscillation frequency (the trough of the filter characteristic curve) is set in such a manner that the attenuation levels of these two frequencies assume substantially the same level. As a result, both color sub-carrier wave components can be properly attenuated, for example, to about a few dB to 10 dB.

The color sub-carrier wave trap 17 having such a trap filter characteristic is inserted between the voltage control terminal of the VCO 13 and the output 12*a* of the PC 12. The abscissa in FIG. 3 represents frequency (tuning frequency).

With the provision of the trapping circuit having the above explained characteristic, a video signal detection circuit which is applicable both to the color sub-carrier wave frequency of 3.5 MHz for the NTSC system and to the color sub-carrier wave frequency of 4.43 MHz for the PAL system is realized.

Further, a single filter can be used in common for other TV broadcasting standards or broadcasting modes, for example, a SECAM system, having the color sub-carrier wave frequency close to the above frequencies.

I claim:

1. A video signal processing device which is applicable to any selected one of a plurality of selected television systems including at least one of an NTSC system and a PAL system, comprising:

a synchronous detection circuit which receives the outputs from a video intermediate frequency amplifier circuit and performs synchronous detection of video signals therein;

a PLL circuit including a phase comparing circuit, a voltage controlled oscillation circuit, and a smoothing circuit, in which the phase comparing circuit compares the outputs from the video intermediate frequency amplifier circuit with the outputs of the voltage controlled oscillation circuit, a signal corresponding to the comparison result is applied to the voltage controlled oscillation circuit via the smoothing circuit and the output of the voltage controlled oscillation circuit is transmitted to said synchronous detection circuit as a reference signal for the synchronous detection; and a trapping circuit which is disposed in a signaling passage from the phase comparing circuit to the voltage controlled oscillation circuit and has a frequency characteristic which attenuates by a predetermined amount of respective frequency signals corresponding to the color sub-carrier wave signal components in the video signals of the NTSC system and PAL system.

2. A video signal processing device according to claim 1, wherein the video intermediate frequency amplifier circuit is designed to receive intermediate frequency signals of video relating signals and sound relating signals from a tuner via a SAW filter, the sound relating signals are separated at a post stage of said synchronous detection circuit, and a filter characteristic of said trapping circuit is set at an intermediate position between 3.58 MHz and 4.43 MHz.

3. A video signal processing device according to claim 2, wherein either the NTSC system or the PAL system is selectable as the television system, the smoothing circuit is a first series circuit constituted by a first capacitor and a resistor which is disposed between an output of the phase comparing circuit and ground, said trapping circuit is a second series circuit constituted by a second capacitor and a coil which is disposed between the junction point of the first capacitor and the resistor and ground, and the center oscillation frequency of the second series circuit is set between 3.58 MHz and 4.5 MHz.

* * * * *